May 20, 1941.  F. W. JOBE  2,242,723
INTERPUPILLARY DISTANCE GAUGE
Filed March 24, 1939
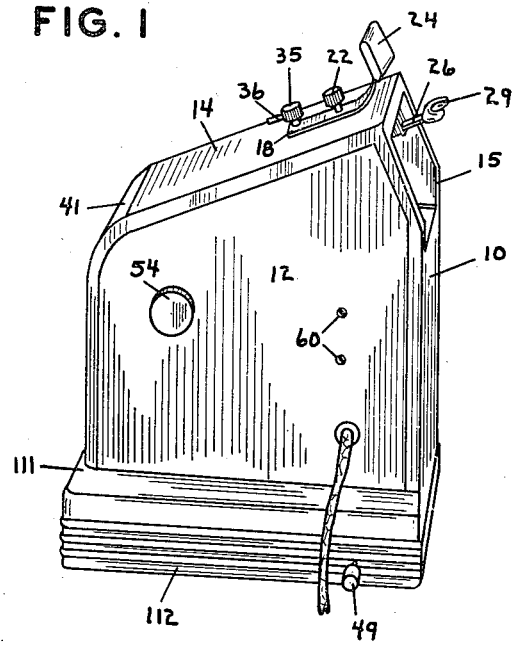
FIG. 1
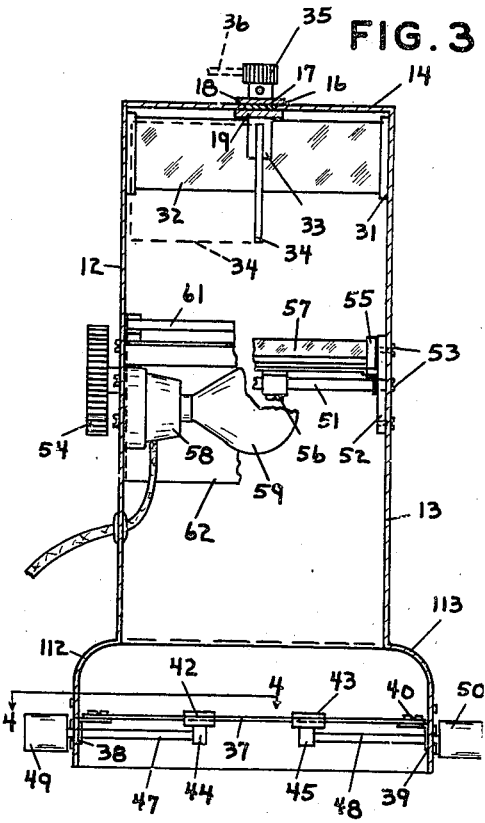
FIG. 3
FIG. 4
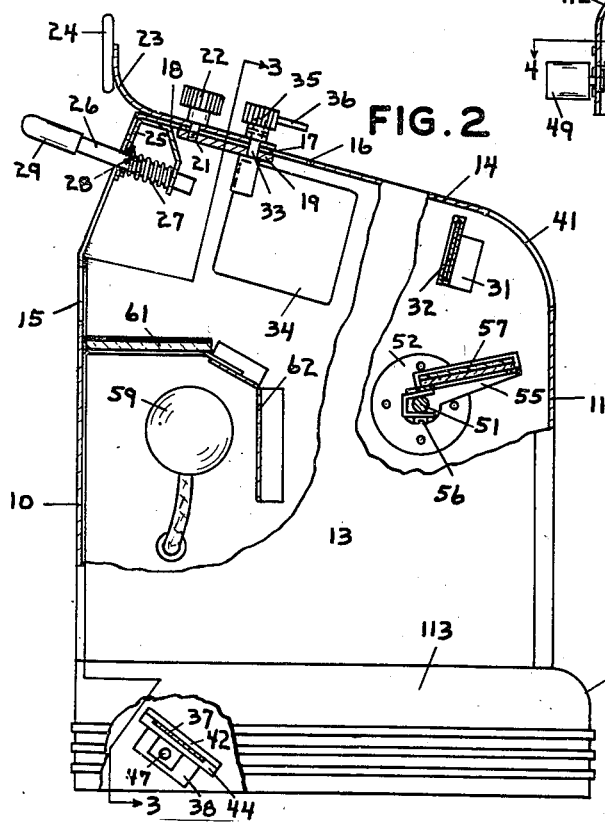
FIG. 2
FREDERICK W. JOBE
INVENTOR
BY
ATTORNEYS Patented May 20, 1941

2,242,723

UNITED STATES PATENT OFFICE 2,242,723

INTERPUPILLARY DISTANCE GAUGE

Frederick W. Jobe, Rochester, N. Y., assignor to Bausch & Lomb Optical Company, Rochester, N. Y., a corporation of New York Application March 24, 1939, Serial No. 263,899

4 Claims. (Cl. 88—20)

The present invention relates to optical instruments and more particularly to instruments for measuring the interpupillary distance of a patient.

One of the objects of the present invention is to produce a simple, convenient and accurate interpupillary distance gauge. Another object is to provide an interpupillary distance gauge having an accurate fixation means and free from any errors due to parallax. A further object is to provide an interpupillary distance gauge in which a scale is optically superposed on the eyes of a patient. These and other objects and advantages reside in the features of construction, combination and arrangement of the various parts and elements as will hereinafter be more fully described and pointed out in the appended claims.

Referring to the drawing:

Fig. 1 is a perspective view of my new interpupillary distance gauge.

Fig. 2 is a side elevation thereof with parts broken away to show internal construction.

Fig. 3 is a section taken on line 3—3 of Fig. 2.

Fig. 4 is a fragmentary section taken on line 4—4 of Fig. 3.

In the embodiment illustrated in the drawing, my new interpupillary distance gauge consists of a housing having a front wall 10, a rear wall 11, side walls 12 and 13 and a top wall 14. The rear and side walls 11, 12 and 13 are flared outwardly at the bottom as indicated at 111, 112 and 113, respectively, to increase the stability of the instrument. The front wall 10 is formed with an opening 15 adjacent the top and the patient whose interpupillary distance is to be measured looks into the housing through this opening.

The top wall 14 of the housing is provided with a longitudinal slot 16 and a slide 17 is movable within this slot 16. A bracket 18 is secured on top of the slide 17 outside the housing and a plate 19 is carried beneath the slide 17 inside of the housing. A screw 21 having an enlarged head 22, extends through the bracket 18 and slide 17 and is threaded into the plate 19. This screw 21 draws the plate 19 and bracket 18 together to clamp the bracket 18 to the top wall 14 of the housing. The forward end of the bracket 18 is bent upward as indicated at 23 and carries a forehead rest 24.

A U-shaped support 25 is mounted within the housing at the junction of the front wall 10 and top wall 14 and projects downward past the edge of the opening 15. A rod 26, slidably mounted in this support 25, is resiliently urged through the opening 15 by a spring 27 which engages one arm of the support 25 and a stop 28 on the rod 26. A nose rest 29 is secured on the outer end of the rod 26.

A frame 31 is secured in the housing adjacent the top wall 14 and carries a mirror 32 facing the opening 15. A stub shaft 33 is rotatably journalled in the bracket 18, slide 17 and plate 19 and a shutter 34 is secured on the lower end of this shaft 33 within the housing between the opening 15 and mirror 32. A knurled head 35 is fixed on the top of the shaft 33 and carries a pointer 36 which indicates the position of the shutter 34. The shutter 34 may be turned to be between the mirror 32 and either eye of the patient, as shown in dotted lines in Fig. 3, or it may be left in the central position shown in Figs. 2 and 3 so that both eyes can see the mirror. Suitable stops, not shown, can be used to locate the shutter in its extreme positions.

A flat scale 37 extends across the lower portion of the housing and is secured on brackets 38 and 39 by screws 40. These brackets 38 and 39 are fastened on the flared wall portions 112 and 113, respectively. The scale 37 is mounted close to the front wall 10 and faces an aperture 41 in the top and rear walls 14 and 11. Two transparent scales 42 and 43 slide over the scale 37 and are secured on carriages 44 and 45, respectively, by screws 46. These two carriages 44 and 45 are operated by rods 47 and 48, respectively, which project through the walls 112 and 113, respectively. Knobs 49 and 50 form convenient grips for operating the rods 47 and 48, respectively.

A shaft 51 is journalled in end plates 52 secured to the walls 12 and 13 by screws 53 and extends transversely across the housing and through the wall 12. A knob 54 serves to rotate this shaft 51. A frame 55 is fixed on the shaft 51 by a screw 56 and carries a semi-transparent reflector 57. This reflector 57 lies between the scale 37 and the opening 41.

A lamp socket 58 carrying a lamp 59 is fastened on the wall 12 adjacent the front wall 10 by screws 60. The lamp 59 is between the scale 37 and opening 15 so that it illuminates both the scale 37 and the eyes of the patient. A suitable diffusing screen 61 is preferably placed between the lamp 59 and the opening 15 and an opaque shield 62 prevents any direct light from lamp 59 from reaching the rear portion of the housing.

In the operation of my interpupillary distance gauge, the patient places his face before the opening 15 so that his forehead rests against the pad 24 and his nose against the nosepad 29. The lamp 59 is lit and the bracket 18 and slide 17 are moved in the groove 16 until the eyes of the patient are the same distance from the reflector 57 as the scale 37. The reflector 57 being semi-transparent, the light from the eyes of the patient and the scale 37 are combined and directed through the opening 41.

The patient looks at the image of one eye in the mirror 32 and the other eye may be occluded by the shutter 34. The scale 37 is graduated in millimeters and the center graduation is designated zero. The observer looks at the reflector 57 through the opening 41 and sees the reflected image of the eye superposed upon the scale 37 and, since both eye and scale are at the same distance from the reflector 57, there is no parallax. The operator reads from the scale the distance of the eye image from the zero mark. The shutter 34 is then reversed to occlude the first eye and the operator reads the distance of the second eye from the zero mark. The sum of these readings is the interpupillary distance.

For the fitting of bifocals, it is desirable to determine the distance from the pupil to the lower lid. In order to determine this, the shaft 51 is tilted by means of the knob 54 until the image of the pupil of the eye falls directly on the transverse center line of the scale 37. The scales 41 and 42 are then moved along the scale 37 until they are aligned with the images of the pupils. The distances between the pupils and lower lids are then read directly from the scales 41 and 42.

From the foregoing, it is apparent that I am able to attain the objects of my invention and provide a simple and accurate interpupillary distance gauge in which a scale is optically superposed on the eyes of the patient and parallax errors are avoided. Various modifications of form and structure can be made without violating the spirit of my invention or departing from the appended claims.

I claim:

1. An interpupillary distance gauge comprising a housing having an opening therein, means for positioning the head of a patient before said opening, means for adjusting the position of the head before said opening, a mirror mounted in said housing facing said opening, said housing having a second opening near the top thereof, a scale positioned adjacent the bottom of said housing and facing said second opening, a light divider positioned within said housing substantially equidistant from the eyes of a patient and the scale for combining light rays from the eyes of the patient and the scale and directing them through the second opening, and a lamp mounted within said housing for illuminating the eyes of the patient and the scale.

2. An interpupillary distance gauge comprising a housing having an opening therein, positioning means adjustably mounted on said housing adjacent said opening for positioning the head of a patient before said opening, a mirror mounted within said housing facing said opening, said housing having a second opening opposite the first-named opening, a scale mounted in the housing facing the second opening, a light divider mounted within said housing for combining the light from the first-named opening and the scale and directing it through the second opening, and means for adjusting the positioning means until the eyes of the patient are at substantially the same distance from the light divider as the scale.

3. An interpupillary distance gauge comprising a housing having front, rear, side and top walls, the front wall having an opening in the upper portion thereof, means carried by the housing for positioning the head of a patient before said opening, a mirror mounted within said housing adjacent said top wall facing said opening for fixing the gaze of the patient, the rear wall of said housing having a second opening behind said mirror, a scale mounted within said housing adjacent the lower part of the front wall and facing the second opening, a source of light mounted within said housing adjacent the front wall between the first-named opening and the scale for illuminating the eyes of a patient and the scale, and a semi-transparent reflector mounted in said housing between the second opening and the scale and positioned to reflect an image of the eyes of a patient through the second opening.

4. An interpupillary distance gauge comprising a housing having two oppositely positioned openings in the upper portions of the walls thereof, means for positioning the head of a patient before the first of said openings, scale means mounted within said housing near the bottom thereof and located to face the second of said openings, a rotatable shaft mounted in said housing below said second opening, a semi-transparent mirror mounted on said shaft substantially in alignment with said scale means and second opening and means within the housing for illuminating the eyes of the patient and said scale.

FREDERICK W. JOBE.